UNITED STATES PATENT OFFICE.

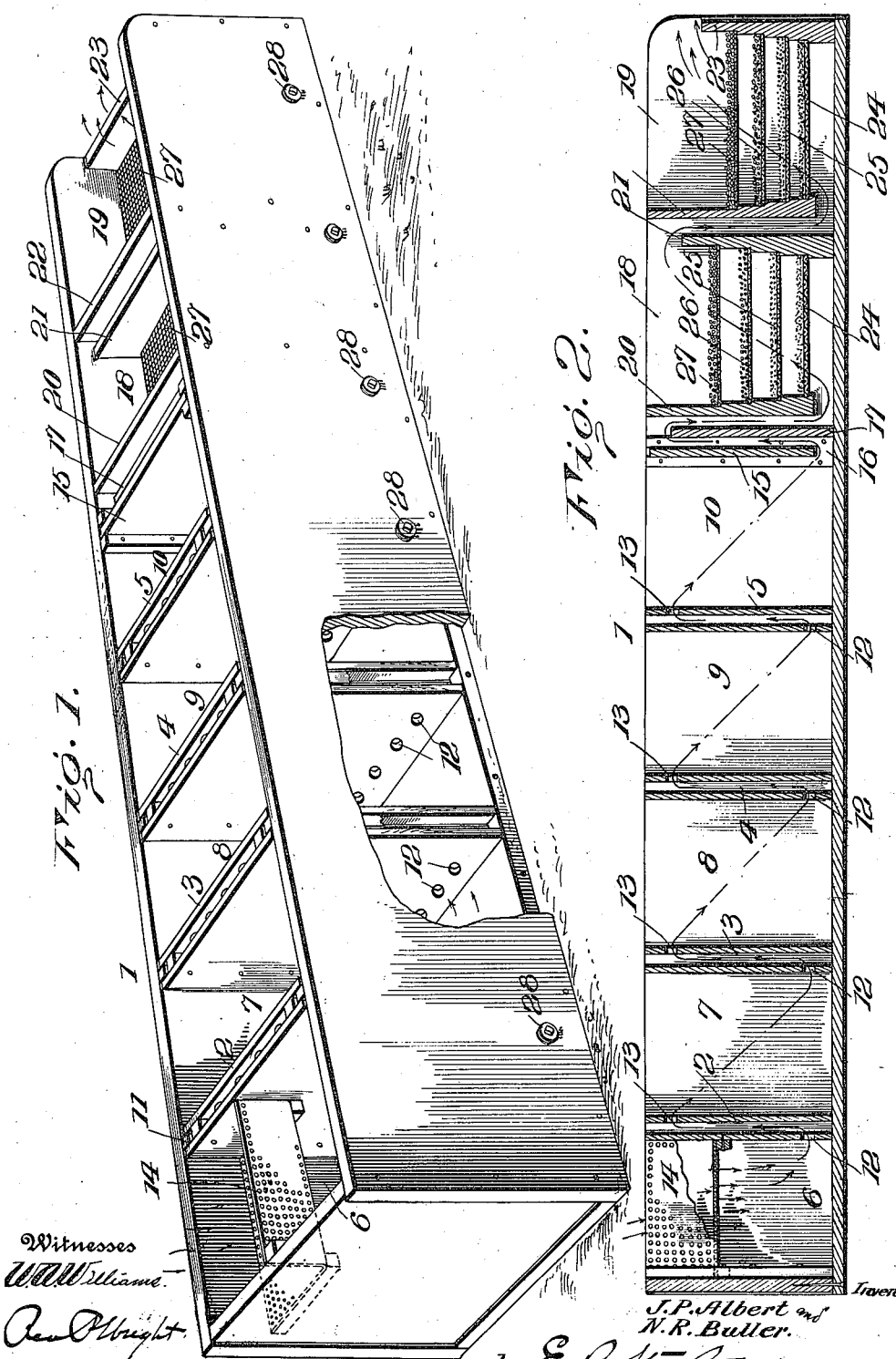

JACOB P. ALBERT, OF WARREN, AND NATHAN R. BULLER, OF HARRISBURG, PENNSYLVANIA.

FILTERING APPARATUS.

1,166,802.  Specification of Letters Patent.  Patented Jan. 4, 1916.

Application filed April 21, 1915. Serial No. 22,886.

*To all whom it may concern:*

Be it known that we, JACOB P. ALBERT and NATHAN R. BULLER, citizens of the United States, residing at Warren and Harrisburg, in the counties of Warren and Dauphin and State of Pennsylvania, respectively, have invented certain new and useful Improvements in Filtering Apparatus, of which the following is a specification, reference being had therein to the accompanying drawing.

This invention relates to certain new and useful improvements in filtering apparatus especially adapted to be used for filtering refuse water and waste that leaves refineries of crude oil, acid works and tanneries; the object being to provide an apparatus in which a series of tanks is employed in which the refuse water passes in succession from one tank to the other, so as to allow the foreign matter to settle within the respective tanks, the lighter or oily matter rising to the surface where it can be pumped off and reclaimed.

Another object of the invention is to provide novel means for conveying the refuse water from one tank to the next tank in the series, whereby the water will be drawn from the bottom of one tank and discharged into the top of the other tank.

Another object of the invention is to provide in connection with the filtering apparatus, a series of granular beds through which the water is forced so as to remove all of the foreign particles therefrom before the same is discharged from the apparatus.

Other and further objects and advantages of the invention will be hereinafter set forth and the novel features thereof defined by the appended claims.

In the drawings—Figure 1, is a perspective of an apparatus constructed in accordance with our invention; and Fig. 2, is a longitudinal vertical section through the same.

Like numerals of reference refer to like parts in the several figures of the drawings.

In carrying out our invention, we employ a trough 1— formed of any suitable material, having a series of transversely arranged hollow partitions 2, 3, 4 and 5 secured therein to form tanks 6, 7, 8, 9 and 10.

The hollow partitions 2, 3, 4 and 5 as herein shown, are secured in position within the trough by cleats 11 in order to enable the same to be detached. However, in some instances, the partitions can be formed integral with the trough especially when the apparatus is formed of cement or other suitable plastic material, and we do not wish to limit ourselves to any particular manner of securing the partitions within the trough or in fact, to any particular manner of forming the respective tanks, as various forms can be employed without departing from the spirit of our invention.

The hollow partitions 2, 3, 4 and 5 are provided with a series of spaced openings 12 adjacent their lower ends forming inlet openings and a series of spaced openings 13 adjacent their upper ends, forming outlet openings through which the water passes from one tank to the adjacent tank, as clearly shown in Fig. 2.

The initial tank 6 is provided with a foraminated strainer 14 into which the refuse water is discharged so as to initially collect the larger particles of foreign matter delivered to the apparatus, the smaller particles which pass through this foraminated strainer settling to the bottom of the tank and as refuse water is being continuously delivered to the initial tank, when the level of the water therein reaches the openings 13, it passes into the next tank of the series and so on through the remaining tanks, the water passing from the bottom of one tank to the top of the adjacent tank so as to allow the fatty matter to rise to the surface where the same is pumped off through the medium of a float nozzle not shown, which is of the well-known construction.

The end wall of the tank 10 is formed by a partition 15 arranged between cleats as shown in Figs. 1 and 2 so as to leave an opening 16 at the bottom of said partition through which a liquid passes, as shown by arrows in Fig. 2.

Extending upwardly from the bottom of the trough adjacent this partition 15, is a partition 17 which terminates short of the upper edge of the trough so as to allow the water to overflow the upper edge thereof.

The end of the trough is provided with filtering chambers 18 and 19 formed by partitions 20, 21, 22 and 23, the partitions 20 and 22 terminating short of the bottom of the trough and the partitions 21 and 23 terminating short of the upper edge of the trough so as to form passageways through which the refuse water passes. The walls of these partitions 20, 21, 22 and 23 are stepped to form shelves upon which are arranged foraminated screens 24, 25, 26 and 27 upon which are placed granular beds of filtering material, and we have found by experimenting that granular beds formed as follows, obtain good results.

Upon the screen 24, a granular bed of limestone is placed and on the screen 25 a granular bed of sand. On the screen 26 a granular bed of cinders is placed, and on the upper screen 27 a granular bed formed of gravel mixed with fuller's earth, or in some instances, the gravel can be omitted and the fuller's earth substituted therefor, and while we have shown these granular beds within the chambers 18 and 19 arranged in this manner, we do not wish to limit ourselves to the exact arrangement of the material upon the respective beds as the same can be changed without departing from the spirit of our invention.

It will be seen that as the refuse water passes over the partition 17 it passes under the partition 20 and is caused to rise through the series of granular filtering beds which remove the greater portion of the particles of foreign matter and as the liquid rises within the chamber 18 it flows over the top of the partition 21 and under the partition 22 and is again passed through a series of granular filtering beds so as to remove any foreign particles which have passed through the first filtering beds.

The tanks 6, 7, 8, 9 and 10 and the chambers 18 and 19 are provided with drain openings 28 in order to allow the tanks and chambers to be flushed out in order to remove the particles which have settled to the bottom thereof.

In the operation of an apparatus constructed as herein shown and described, the refuse water is initially discharged into the initial strainer 14 where the larger particles of foreign matter are collected, the liquid passing through the foraminated strainer into the tank 6 and rises through the hollow partition 2 and is discharged through the openings 13 into the tank 7, this operation being repeated until the tank 10 is reached; means for collecting the fatty substances and oil rising to the surface of the tanks 6, 7, 8, 9 and 10, being provided, so as to reclaim the oil.

The refuse water leaves the tank 10 under the partition 15, passes over the partition 17 under the partition 20 and up through the filtering material arranged on the foraminated supports which are of different mesh and contain filtering material of various kinds so as to remove the foreign particles therefrom and as the liquid reaches a level with the top of the partition 21 it passes over the same, under the partition 22 and is again passed through the series of filtering beds and is discharged from over the top of the partition 23.

We claim:

1. A filtering apparatus, comprising a series of tanks separated by detachable hollow partitions, one wall of each partition having inlets adjacent its lower end, and the opposite wall having outlets adjacent its upper end.

2. A filtering apparatus, comprising a series of communicating tanks formed by a spaced detachably mounted hollow partitions and the series of filtering chambers arranged in tandem, said hollow partitions having openings adjacent their upper and lower edges communicating respectively with said tanks, two of the opposing walls of the filtering chamber being provided with shelves and a series of foraminated supports arranged upon said shelves, filtering beds carried by said supports, one of said tanks being provided with an initial straining device, and one of said filtering chambers being provided with an outlet.

3. A filtering apparatus comprising a trough having a series of detachable hollow partitions forming a plurality of settling tanks and filtering chambers, said tanks and chambers being in communication with each other adjacent their upper and lower edges, the partitions forming the filtering chambers being stepped, a series of superposed supports mounted upon said steps, and a series of superposed filtering beds arranged upon said supports.

4. A filtering apparatus, comprising a trough having a series of detachable hollow partitions forming a plurality of settling tanks, and a series of staggeredly arranged partitions forming filtering chambers, said hollow partitions being provided with openings adjacent their top and bottom communicating with the respective tanks, the other partitions of said trough forming zigzag passageways for conveying the fluid upwardly through the superposed filtering beds.

5. A filtering apparatus comprising a trough having spaced vertically disposed cleats secured to the inner face of the walls thereof, hollow partitions having their ends arranged over said cleats, the walls of said partitions being provided with spaced openings in different horizontal planes, and a series of filtering chambers arranged in line with said trough and communicating therewith, said filtering chambers carrying superposed foraminated supports, each support having a filtering bed mounted thereon.

6. A filtering apparatus comprising a trough provided with a plurality of oppositely disposed cleats secured to the walls thereof, hollow partitions slidably mounted upon said cleats forming a series of settling tanks, said partitions being provided with openings in different horizontal planes communicating with said tanks, and a series of superposed filtering beds communicating with one of the series of said tanks.

In testimony whereof we hereunto affix our signatures in the presence of witnesses.

JACOB P. ALBERT.
NATHAN R. BULLER.

Witnesses:
PAUL A. KUNKEL,
ROBERT R. FEATENBY,
ROBERT P. DEITER.